(12) United States Patent
Sahara

(10) Patent No.: US 8,379,776 B2
(45) Date of Patent: Feb. 19, 2013

(54) OFDM COMMUNICATION DEVICE AND GUARD INTERVAL LENGTH DECISION METHOD

(75) Inventor: Toru Sahara, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1093 days.

(21) Appl. No.: 12/306,207

(22) PCT Filed: Jun. 26, 2006

(86) PCT No.: PCT/JP2006/312749
§ 371 (c)(1), (2), (4) Date: Dec. 22, 2008

(87) PCT Pub. No.: WO2008/001424
PCT Pub. Date: Jan. 3, 2008

(65) Prior Publication Data
US 2009/0304126 A1 Dec. 10, 2009

(51) Int. Cl.
*H03D 1/00* (2006.01)
*H04J 13/00* (2011.01)
*H04B 1/26* (2006.01)
(52) U.S. Cl. .................... 375/343; 370/479; 455/323
(58) Field of Classification Search .............. 375/343, 375/146; 370/479
See application file for complete search history.

(56) References Cited

U.S. PATENT DOCUMENTS

| 5,809,060 | A * | 9/1998 | Cafarella et al. ............ 375/146 |
| 5,917,829 | A * | 6/1999 | Hertz et al. .................. 370/479 |
| 7,480,235 | B2 * | 1/2009 | Fujii et al. ................... 370/208 |
| 2001/0030991 | A1 * | 10/2001 | Imai et al. ................... 375/145 |
| 2003/0076891 | A1 * | 4/2003 | Won ............................ 375/267 |
| 2004/0091057 | A1 * | 5/2004 | Yoshida ...................... 375/260 |
| 2004/0240479 | A1 * | 12/2004 | Bohnhoff ..................... 370/514 |
| 2004/0242181 | A1 * | 12/2004 | Hepler et al. ................ 455/323 |
| 2004/0258146 | A1 | 12/2004 | Harikumar |
| 2004/0264431 | A1 | 12/2004 | Rhodes |

(Continued)

FOREIGN PATENT DOCUMENTS

| JP | 2002-374223 | 12/2002 |
| JP | 2005-252886 | 9/2005 |

(Continued)

OTHER PUBLICATIONS

European supplementary search report for corresponding European application 06767366.5 lists the reference above.

*Primary Examiner* — David C. Payne
*Assistant Examiner* — Sarah Hassan
(74) *Attorney, Agent, or Firm* — DLA Piper LLP (US)

(57) ABSTRACT

Even if background noise is present, it is possible to control a guard interval length so that a minimum required SINR can be obtained. An OFDM communication device (10) includes: a correlation calculation unit (14) for calculating a correlation between a series of symbols to be received and a held signal that has a waveform identical to a waveform of a known signal contained in the series of symbols; a desired signal power acquisition unit (19) for acquiring a desired signal power based on a calculation result; a background noise power acquisition unit (22) for acquiring a background noise power that indicates a difference amount between a reception power of each of the series of symbols and the desired signal power; and a GI length determination/instruction unit (23) for determining the guard interval length in accordance with the background noise power and instructing a transmitter to transmit the series of symbols with the determined guard interval length.

4 Claims, 5 Drawing Sheets

U.S. PATENT DOCUMENTS

Figure 1:
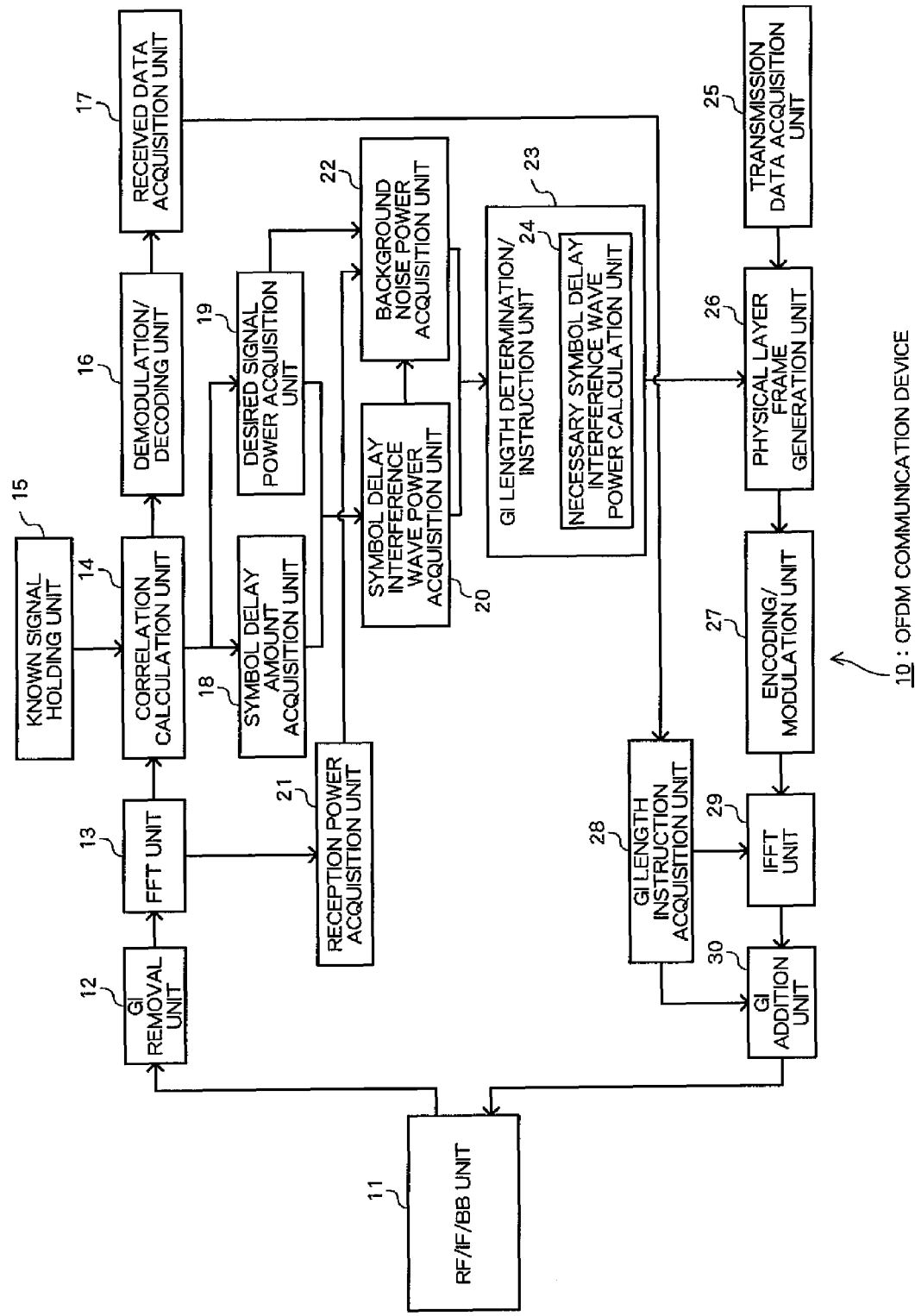

| | | | |
|---|---|---|---|
| 2005/0163238 A1* | 7/2005 | Fujii | 375/260 |
| 2005/0237918 A1 | 10/2005 | Asai et al. | 370/203 |
| 2005/0276242 A1 | 12/2005 | Goto et al. | 370/328 |
| 2006/0114815 A1* | 6/2006 | Hasegawa et al. | 370/208 |

FOREIGN PATENT DOCUMENTS

| | | |
|---|---|---|
| JP | 2005-303826 | 10/2005 |
| WO | 9730531 A1 | 8/1997 |

* cited by examiner

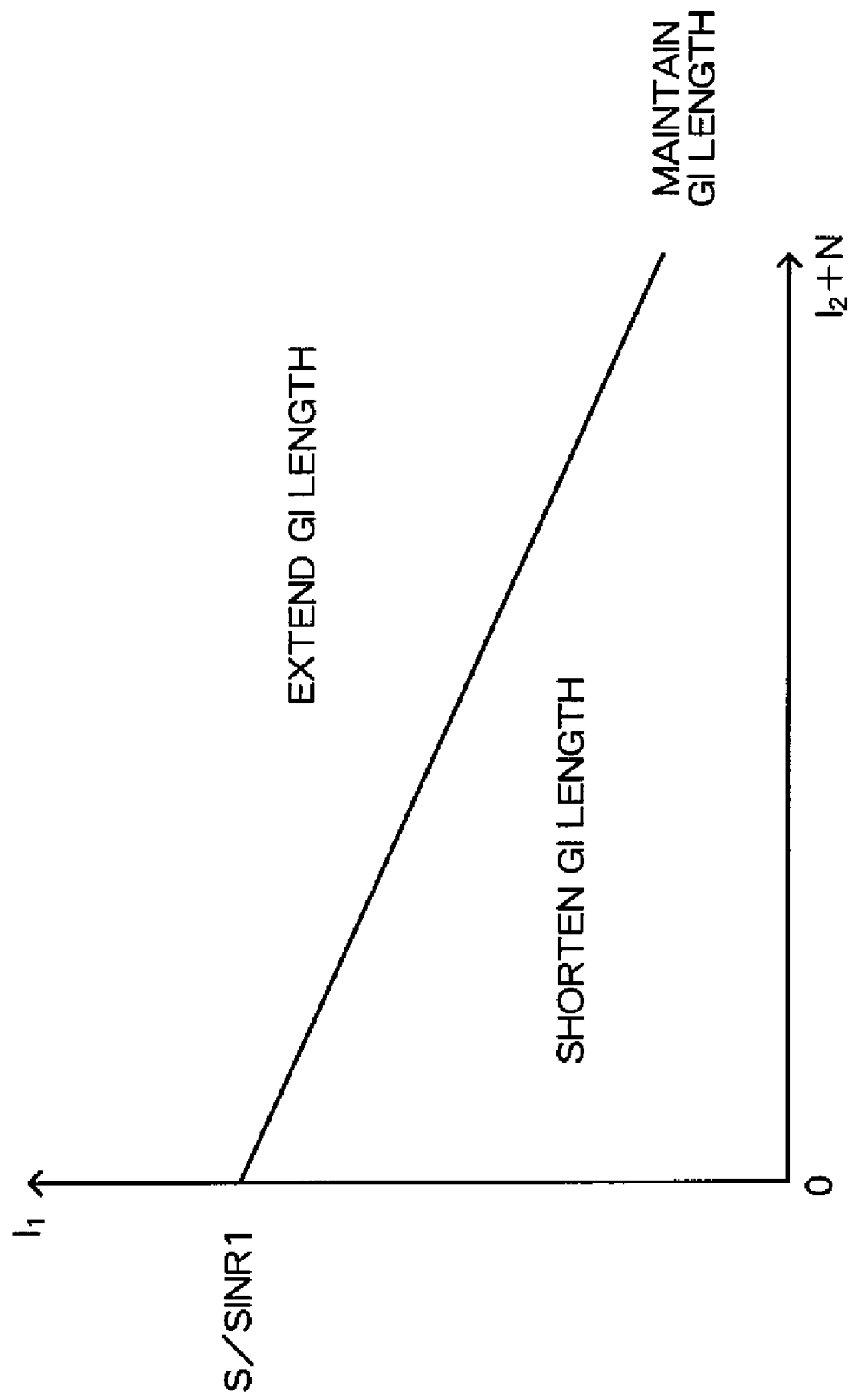

OFDM COMMUNICATION DEVICE AND GUARD INTERVAL LENGTH DECISION METHOD

TECHNICAL FIELD

The present invention relates to an OFDM communication device and a method of determining a guard interval length.

BACKGROUND ART

In orthogonal frequency division multiplexing (OFDM), if a certain symbol is delayed, that symbol becomes an interference wave against the subsequent symbol, resulting in a decline of a signal to interference and noise ratio (SINR) of the subsequent symbol. In order to prevent this, a guard interval (GI) is provided at the head of the symbol.

In Patent Document 1, there is described a technology of controlling a guard interval length in accordance with a symbol delay amount. The SINR increases as the guard interval becomes longer, but this causes the communication rate to decrease. Accordingly, with this technology, while keeping a balance between the communication rate and the SINR, the guard interval length is so determined that a minimum required SINR can be obtained.

Further, in Patent Document 2, there is disclosed a technology of reducing, in a case where the same sub-carriers are transmitted from a plurality of transmitters, which occurs at a time of, for example, handover, interference between symbols that are transmitted from each of the transmitters. Further, in Patent Document 3, there is disclosed a technology of improving frequency usage efficiency in OFDM.

Patent Document 1: JP 2002-374223 A
Patent Document 2: JP 2005-303826 A
Patent Document 3: JP 2005-252886 A

DISCLOSURE OF THE INVENTION

Problems to be Solved by the Invention

However, the SINR is also affected by another interference wave than an interference wave caused by a symbol delay (hereinafter, referred to as symbol delay interference wave) or by noises (hereinafter, those are collectively referred to as background noise). When such background noise is present, the minimum required SINR may not be obtained, even with the technology described in Patent Document 1 described above.

Specifically, the SINR is obtained by dividing a "desired signal power" by an "interference wave power and noise power", and the "interference wave power and noise power" includes both a "symbol delay interference wave power" and a "background noise power". Hence, even if the guard interval length is controlled in accordance with the symbol delay amount, the minimum required SINR cannot be obtained in some cases.

Therefore, an object of the present invention is to provide an OFDM communication device and a method of determining a guard interval length, which are capable of controlling a guard interval length so that a minimum required SINR can be obtained even if background noise is present.

Means for Solving the Problems

In order to solve the above-mentioned problem, an OFDM communication device according to the present invention includes: a reception unit for receiving a series of symbols that contain a known signal portion; a correlation calculation unit for calculating a correlation between the series of symbols received by the reception unit and a held signal that has a waveform identical to a waveform of the known signal; a desired signal power acquisition unit for acquiring a desired signal power based on a calculation result from the correlation calculation unit; a background noise power acquisition unit for acquiring a background noise power that indicates a difference amount between a reception power of each of the series of symbols and the desired signal power acquired by the desired signal power acquisition unit; a guard interval length determination unit for determining a guard interval length in accordance with the background noise power acquired by the background noise power acquisition unit; and a guard interval length instruction unit for instructing a transmitter to transmit the series of symbols with the guard interval length determined by the guard interval length determination unit.

With this configuration, the guard interval length can be determined in accordance with the background noise power, and hence the above-mentioned OFDM communication device can control the guard interval length so that the minimum required SINR can be obtained even if the background noise is present.

Further, the above-mentioned OFDM communication device may further include: a symbol delay amount acquisition unit for acquiring a symbol delay amount based on the calculation result from the correlation calculation unit; and a symbol delay interference wave power acquisition unit for acquiring a symbol delay interference wave power, which is an interference wave power in a case where a certain symbol becomes an interference wave against a subsequent symbol, based on the desired signal power acquired by the desired signal power acquisition unit and the symbol delay amount acquired by the symbol delay amount acquisition unit. The guard interval length determination unit may determine the guard interval length in accordance with the background noise power acquired by the background noise power acquisition unit and the symbol delay interference wave power acquired by the symbol delay interference wave power acquisition unit.

With this configuration, the guard interval length can be determined in accordance with both the background noise power and the symbol delay interference wave power, and hence the above-mentioned OFDM communication device can control the guard interval length so that the minimum required SINR can be obtained more preferably even if the background noise is present.

Further, in the above-mentioned OFDM communication device, the guard interval length determination unit may include a necessary symbol delay interference wave power calculation unit for calculating, based on the background noise power acquired by the background noise power acquisition unit, a necessary symbol delay interference wave power required for setting an SINR to a predetermined value, and the guard interval length determination unit may determine the guard interval length based on the necessary symbol delay interference wave power calculated by the necessary symbol delay interference wave power calculation unit and the symbol delay interference wave power acquired by the symbol delay interference wave power acquisition unit.

With this configuration, while taking the background noise into account, the guard interval length can be so determined that the SINR becomes the predetermined value.

Further, according to the present invention, a method of determining a guard interval length includes: a reception step of receiving a series of symbols that contain a known signal portion; a correlation calculation step of calculating a correlation between the series of symbols received in the reception step and a held signal that has a waveform identical to a waveform of the known signal; a symbol delay amount acquisition step of acquiring a symbol delay amount based on a calculation result of the correlation calculation; a desired signal power acquisition step of acquiring a desired signal power based on the calculation result of the correlation calculation; a symbol delay interference wave power acquisition step of acquiring a symbol delay interference wave power, which is an interference wave power in a case where a certain symbol becomes an interference wave against a subsequent symbol, based on the desired signal power acquired in the desired signal power acquisition step and the symbol delay amount acquired in the symbol delay amount acquisition step; a background noise power acquisition step of acquiring a background noise power that indicates a difference amount between a reception power of each of the series of symbols and the desired signal power acquired in the desired signal power acquisition step; a guard interval length determination step of determining a guard interval length in accordance with the background noise power acquired in the background noise power acquisition step and the symbol delay interference wave power acquired in the symbol delay interference wave power acquisition step; and a guard interval length instruction step of instructing a transmitter to transmit the series of symbols with the guard interval length determined in the guard interval length determination step.

BRIEF DESCRIPTION OF THE DRAWINGS (FIG. 1) A diagram illustrating a system configuration and functional blocks of an OFDM communication device according to an embodiment of the present invention.

(FIG. 2) An explanatory diagram for describing a radio signal according to the embodiment of the present invention.

(FIG. 3) An explanatory diagram for describing a symbol according to the embodiment of the present invention.

(FIG. 4) A diagram illustrating a processing flow of the OFDM communication device according to the embodiment of the present invention.

(FIG. 5) A diagram illustrating a relation between a GI length, and a background noise power and a symbol delay interference wave power according to the embodiment of the present invention.

BEST MODE FOR CARRYING OUT THE INVENTION

With reference to the drawings, an embodiment of the present invention is described.

FIG. 1 is a diagram illustrating a system configuration and functional blocks of an OFDM communication device 10 according to the embodiment of the present invention. As illustrated in FIG. 1, in terms of functions, the OFDM communication device 10 includes a radio frequency (RF)/interfrequency (IF)/base band (BB) unit 11, a guard interval (GI) removal unit 12, a fast Fourier transform (FFT) unit 13, a correlation calculation unit 14, a known signal holding unit 15, a demodulation/decoding unit 16, a received data acquisition unit 17, a symbol delay amount acquisition unit 18, a desired signal power acquisition unit 19, a symbol delay interference wave power acquisition unit 20, a reception power acquisition unit 21, a background noise power acquisition unit 22, a guard interval (GI) length determination/instruction unit 23, a transmission data acquisition unit 25, a physical layer frame generation unit 26, an encoding/modulation unit 27, a guard interval (GI) length instruction acquisition unit 28, an inverse fast Fourier transform (IFFT) unit 29, and a guard interval (GI) addition unit 30. Further, the GI length determination/instruction unit 23 includes a necessary symbol delay interference wave power calculation unit 24.

The OFDM communication device 10 is a communication device used as a mobile station device or a base station device in a mobile communication system, and performs communications by means of OFDM. It should be noted that a communication partner of the OFDM communication device 10 is also a communication device similar to the OFDM communication device 10. Hereinbelow, functions of the above-mentioned respective functional units that are included in the OFDM communication device 10 are described specifically.

The RF/IF/BB unit 11 receives a radio signal transmitted from the communication partner by means of a super-heterodyne system, and outputs the received signal to the GI removal unit 12.

A description is now made of a radio signal used in OFDM.

Figure 2:
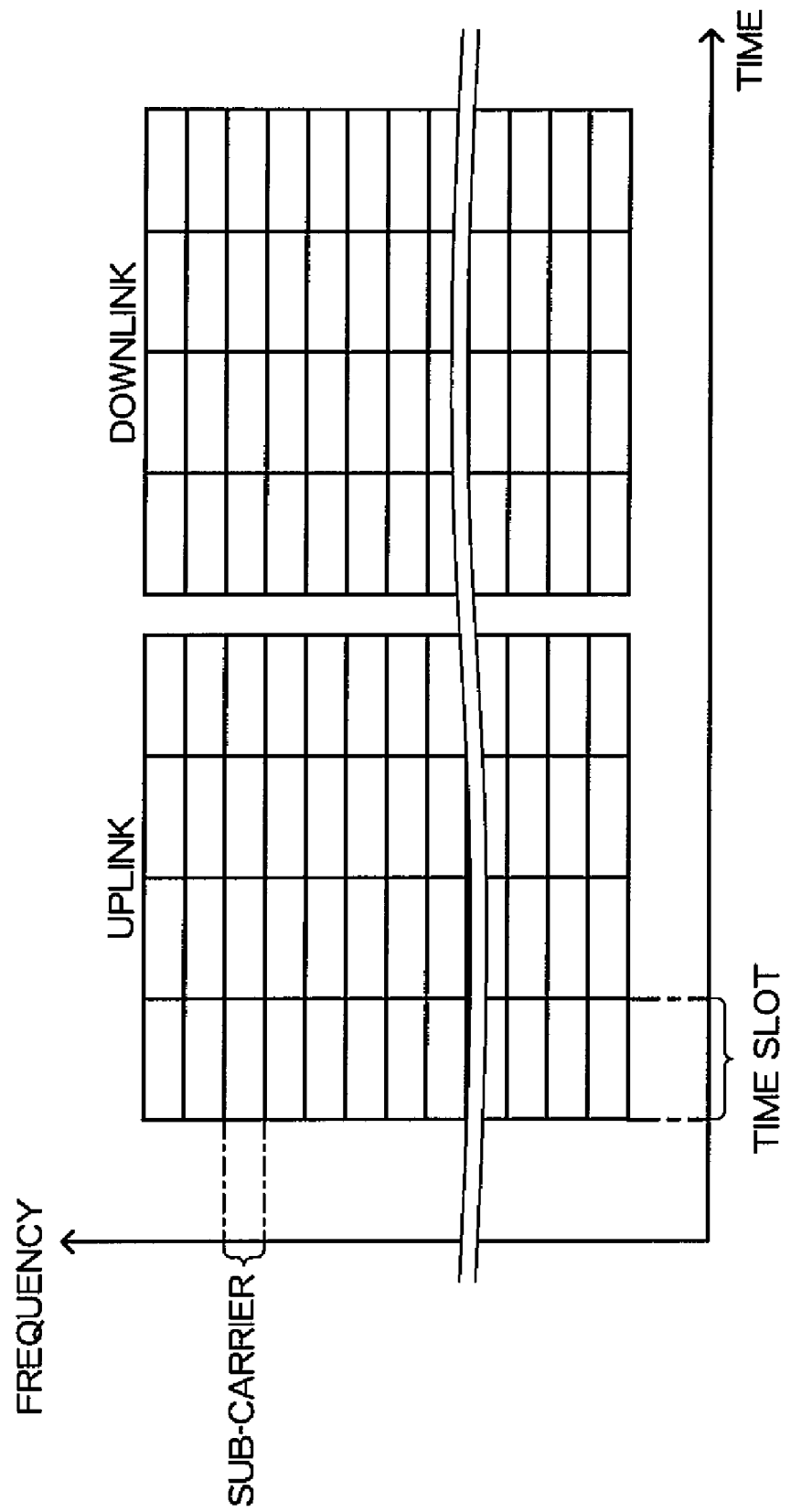

FIG. 2 is an explanatory diagram for describing the radio signal used in OFDM. In FIG. 2, the axis of ordinate represents a frequency axis, whereas the axis of abscissa represents a time axis. Individual rectangles represent transmission units of the radio signal. A time length of the transmission unit is equal to a time slot length.

In OFDM, a symbol (signal constellation point indicating data of one or more bits, which is obtained from single modulation) sequence is mapped onto a complex plane for each series of symbols (hereinafter, referred to as unit symbol sequence), the number of which is in accordance with a GI length. After D/A conversion, the mapped symbol sequence is subjected to inverse fast Fourier transform. As a result, the above-mentioned symbol sequence is dispersed among multiple sub-carriers on a unit-symbol-sequence basis. The above-mentioned transmission unit is made of the unit symbol sequence thus dispersed.

Figure 3:
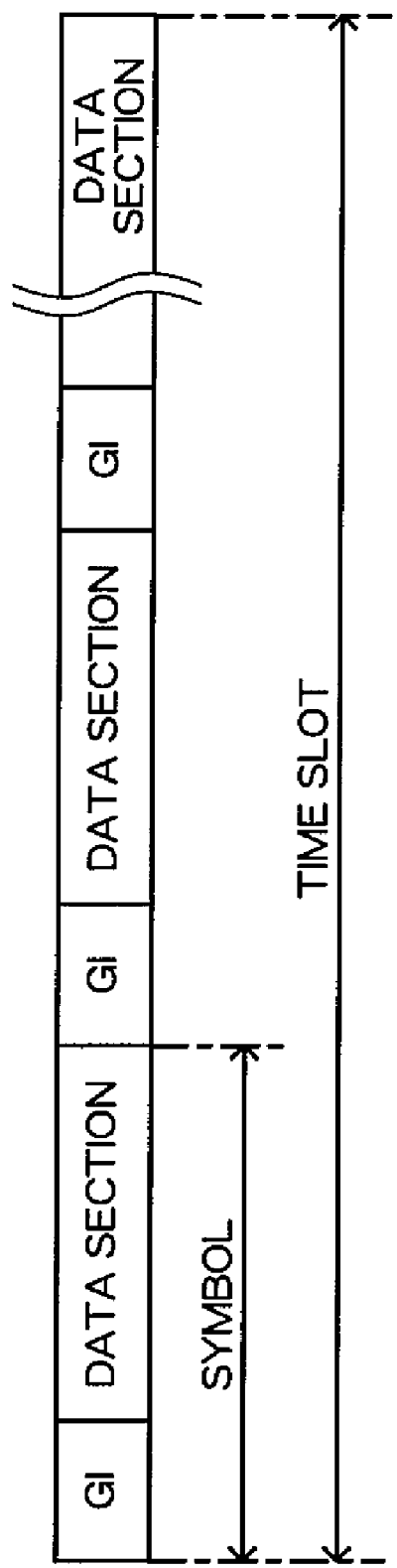

FIG. 3 illustrates a content of the above-mentioned unit symbol sequence in detail. As illustrated in FIG. 3, each unit symbol sequence includes a plurality of symbols, and each symbol includes a GI and a data section. More specifically, the data section includes an analog signal that indicates a symbol and has a predetermined time length. The GI may be configured to include part (normally, analog signal ranging over GI length from end of data section) of the analog signal constituting the data section, or not to include a significant signal.

The GI removal unit 12 removes the GIs from the radio signal that is input from the RF/IF/BB unit 11, and then outputs the resultant signal to the FFT unit 13.

The FFT unit 13 carries out fast Fourier transform with respect to the radio signal that has been input from the GI removal unit 12. As a result, the FFT unit 13 acquires, for each transmission unit described above, a unit symbol sequence prior to inverse fast Fourier transform, and then outputs the acquired unit symbol sequence to the correlation calculation unit 14. It should be noted that the unit symbol sequence thus acquired includes interference components and noise components.

Here, the above-mentioned unit symbol sequence includes a known signal portion (also referred to as unique word). Further, the known signal holding unit 15 holds a signal having the same waveform as that of this known signal portion. The correlation calculation unit 14 calculates a correlation between the unit symbol sequence that has been input from the FET unit 13 and a held signal that is held by the known signal holding unit 15 and has the same waveform as that of the above-mentioned known signal. Through this processing, the correlation calculation unit 14 judges that a part having the largest correlation value is the known signal portion within the unit symbol sequence. Then, the result of the judgment and the unit symbol sequence are output to the demodulation/decoding unit 16.

The demodulation/decoding unit 16 acquires a demodulation timing of the known signal portion within the unit symbol sequence based on the input result of the judgment. Then, in accordance with the demodulation timing thus acquired, the unit symbol sequence is demodulated with a modulation scheme used for modulating the unit symbol sequence concerned. The demodulation/decoding unit 16 further decodes, with a predetermined encoding method, a bit sequence obtained as the result of the demodulation, and then outputs the decoded bit sequence to the received data acquisition unit 17. The received data acquisition unit 17 acquires the received data based on the bit sequence that is input from the demodulation/decoding unit 16.

The symbol delay amount acquisition unit 18 acquires a symbol delay amount based on the result of the calculation from the correlation calculation unit 14. In other words, the symbol delay amount acquisition unit 18 acquires, as the symbol delay amount, a difference between a timing at which the above-mentioned known signal portion is received and a timing at which the above-mentioned known signal portion is originally expected to be received.

In general, due to the influence of multipath or the like, the above-mentioned unit symbol sequence is dispersed in terms of time, and hence some identical unit symbol sequences are received. The timing at which the above-mentioned known signal portion is received is also dispersed into a plurality of timings. The symbol delay amount acquisition unit 18 acquires, as the symbol delay amount, a degree of delay for each of a plurality of the unit symbol sequences that are received in a dispersed manner.

The desired signal power acquisition unit 19 acquires, based on the result of the calculation from the correlation calculation unit 14, a desired signal power for each of the plurality of the unit symbol sequences that are received in a dispersed manner.

The symbol delay interference wave power acquisition unit 20 acquires a symbol delay interference wave power (denoted as $I_1$), which is an interference wave power in a case where a certain symbol becomes an interference wave against the subsequent symbol, based on the desired signal power acquired by the desired signal power acquisition unit 19 and the symbol delay amount acquired by the symbol delay amount acquisition unit 18. Specifically, the symbol delay interference wave power acquisition unit 20 acquires the symbol delay interference wave power $I_1$ by summing up the desired signal powers of the unit symbol sequences that have their symbol delay amounts exceeding the GI length.

The reception power acquisition unit 21 acquires a reception power of the unit symbol sequence acquired by the FFT unit 13.

The background noise power acquisition unit 22 acquires a background noise power (denoted as $I_2+N$), which indicates a difference amount between the reception power acquired by the reception power acquisition unit 21 and the desired signal power acquired by the desired signal power acquisition unit 19. The background noise power $I_2+N$ may be calculated by subtracting the desired signal power from the reception power. Alternatively, in a case where it can be assumed that the background noise results from frequency fluctuation alone caused by the Doppler effect, the background noise power $I_2+N$ can be calculated as follows.

Specifically, based on fluctuations of amplitude and phase within a predetermined period of time (e.g., within period for update of GI length performed by GI length determination/instruction unit 23 described below), the background noise power $I_2+N$ is calculated. Specifically, the background noise power $I_2+N$ is the sum of squared absolute values of error vectors each indicating a difference between a signal constellation point of each symbol constituting the received unit symbol sequence and its ideal signal constellation point. This is expressed as the following Expression (1). It should be noted that m represents a symbol number; M, the number of symbols within the above-mentioned predetermined period of time; k, a sub-carrier number; and K, the number of sub-carriers. Further, $V_{mk}$ represents a signal constellation vector in a case of the symbol number m and the sub-carrier number k, and $V_{mkr}$ represents an ideal signal constellation vector in a case of the symbol number m and the sub-carrier number k.

[Expression 1]

$$I_2 + N = \sum_{m=1}^{M} \left( \sum_{k=1}^{K} (|V_{mk} - V_{mkr}|^2) \right) \quad (1)$$

It should be noted that Expression (1) indicates the sum of all the background noise components included in M symbols and K sub-carriers. In a case where this value is used for comparison with another power or calculation thereof, corresponding symbol delay interference wave power $I_1$, background noise power $I_2+N$, necessary symbol delay interference wave power $I_{1MAX}$ (described below), etc. are each the sum of all individual components included in M symbols and K sub-carriers as well.

The GI length determination/instruction unit 23 determines the GI length in accordance with the background noise power $I_2+N$ acquired by the background noise power acquisition unit 22 and the symbol delay interference wave power $I_1$ acquired by the symbol delay interference wave power acquisition unit 20.

Specifically, the necessary symbol delay interference wave power calculation unit 24 calculates the necessary symbol delay interference wave power $I_{1MAX}$ for setting an SINR to a predetermined value (minimum required SINR for establishing communication), based on the background noise power $I_2+N$ acquired by the background noise power acquisition unit 22. The GI length determination/instruction unit 23 determines the GI length based on the necessary symbol delay interference wave power $I_{1MAX}$ thus calculated and the symbol delay interference wave power $I_1$ acquired by the symbol delay interference wave power acquisition unit 20. More specifically, the GI length determination/instruction unit 23 determines the GI length such that the symbol delay interference wave power acquired by the symbol delay interference wave power acquisition unit 20 becomes equal to the necessary symbol delay interference wave power $I_{1MAX}$.

After the GI length determination/instruction unit 23 determines the GI length as described above, the GI length determination/instruction unit 23 instructs the communication partner to transmit the series of symbols with that GI length. Specifically, the GI length determination/instruction unit 23 generates GI length instruction information that specifies the GI length for instruction, and then outputs the GI length instruction information to the physical layer frame generation unit 26. Consequently, the GI length instruction information is transmitted to the communication partner. Hereinbelow, referring to the details thereof, the transmission of the series of symbols by the OFDM communication device 10 is described.

The transmission data acquisition unit 25 acquires a bit sequence constituting transmission data. The physical layer frame generation unit 26 adds a physical layer header to the bit sequence acquired by the transmission data acquisition unit 25, and then outputs the resultant bit sequence to the encoding/modulation unit 27. At this point, the physical layer frame generation unit 26 puts into the physical layer header the GI length instruction information that is input from the GI length determination/instruction unit 23.

The encoding/modulation unit 27 encodes the transmission data, which has been input from the physical layer frame generation unit 26 after the physical layer header is added, with a predetermined encoding method, thereby acquiring encoded data. Further, the encoding/modulation unit 27 modulates the encoded data with a given modulation scheme to generate a symbol sequence, and then outputs the generated symbol sequence to the IFFT unit 29. It should be noted that the modulation scheme used by the encoding/modulation unit 27 for modulating the encoded data preferably employs an adaptive modulation scheme, in which the modulation scheme is changed as necessary in accordance with the radio condition (reception condition).

The GI length instruction acquisition unit 28 acquires, from the received data acquired by the received data acquisition unit 17, the GI length instruction information transmitted from the communication partner through processing similar to the case of the OFDM communication device 10 concerned.

The IFFT unit 29 determines the number of symbols to be included in a unit symbol sequence based on the GI length instruction information acquired by the GI length instruction acquisition unit 28. In this determination, as the GI length becomes longer, the number of symbols becomes smaller. Then, the IFFT unit 29 divides the symbol sequence that has been input from the encoding/modulation unit 27 into unit symbol sequences, which are then mapped onto the complex plane. After D/A conversion, the IFFT unit 29 executes inverse fast Fourier transform. As a result, the symbol sequence is dispersed among multiple sub-carriers on a unit-symbol-sequence basis. The IFFT unit 29 outputs the signal thus obtained to the GI addition unit 30.

The GI addition unit 30 adds a GI, which has a length determined based on the GI length instruction information acquired by the GI length instruction acquisition unit 28, to the head of each symbol constituting the unit symbol sequence, and then outputs the signal to the RF/IF/BB unit 11.

The RF/IF/BB unit 11 transmits by radio the signal that is input from the GI addition unit 30 by means of the super-heterodyne system.

With regard to the processing described above, the description therefor is again made in more details with reference to a processing flow of the OFDM communication device 10.

Figure 4:
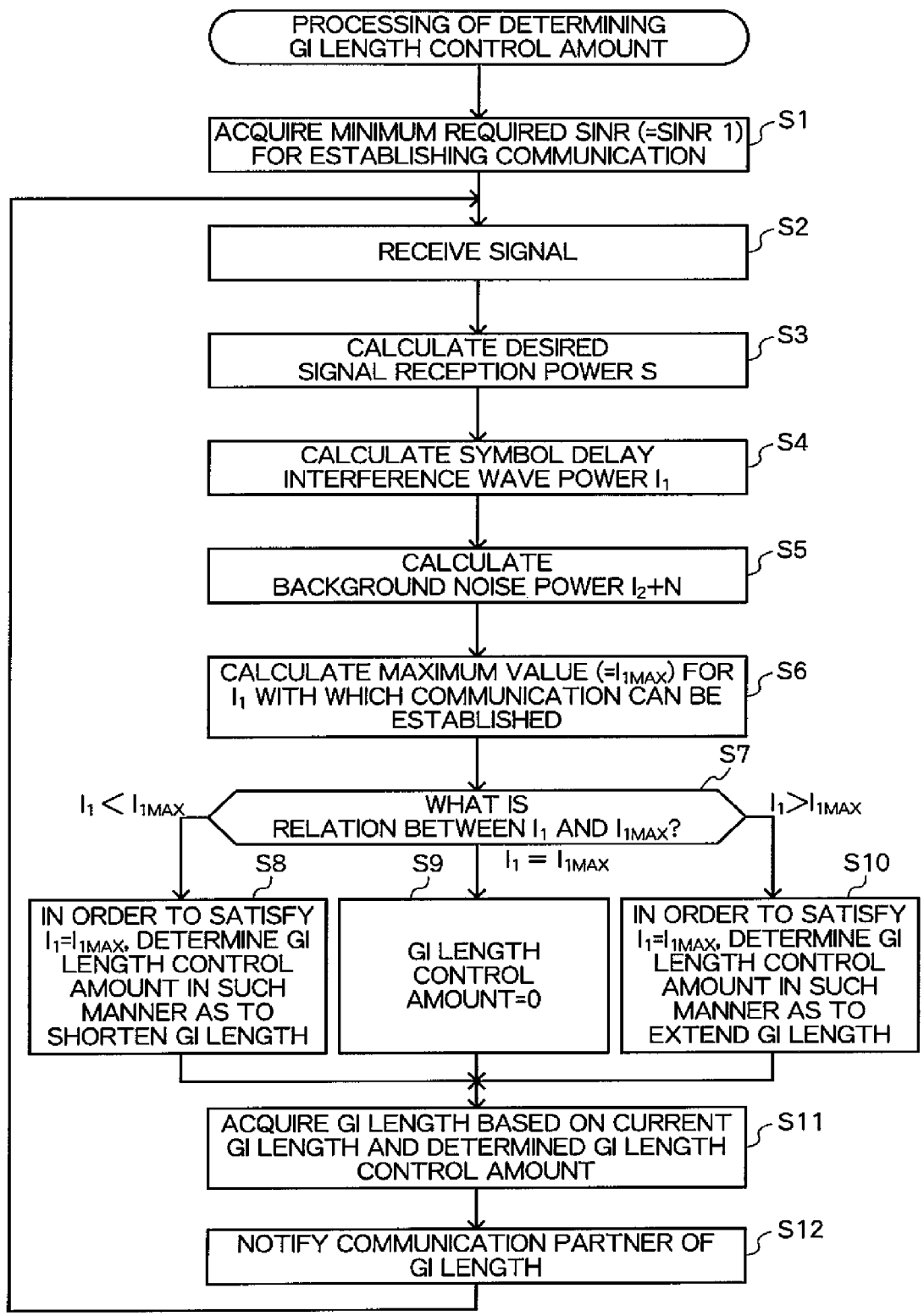

FIG. 4 is a diagram illustrating the processing flow of the OFDM communication device 10. As illustrated in FIG. 4, the OFDM communication device 10 first acquires a minimum required SINR for establishing communication. Hereinafter, this SINR is referred to as SINR 1 (S1).

Upon receiving a signal (S2), the OFDM communication device 10 calculates a desired signal reception power S (S3), the symbol delay interference wave power $I_1$ (S4), and the background noise power $I_2$+N (S5) as described above. After calculating those powers, the OFDM communication device 10 calculates the maximum value $I_{1MAX}$ for $I_1$, with which communication can be established. In other words, the OFDM communication device 10 calculates the maximum value $I_{MAX}$ for $I_1$, which is an allowable value even if the background noise power $I_2$+N is present. Specifically, the maximum value $I_{1MAX}$ is calculated with the following Expression (2) (S6).

$$I_{1MAX} = S/\text{SINR1} - (I_2+N) \qquad (2)$$

The OFDM communication device 10 compares $I_1$ calculated in S2 and $I_{1MAX}$ calculated in S6, and then performs different processing in accordance with its result (S7). When $I_1$ is smaller than $I_{1MAX}$, this means that communication can be established even if $I_1$ is set larger. Accordingly, in order to make $I_1$ larger, the OFDM communication device 10 determines, in accordance with a difference between $I_1$ and $I_{1MAX}$, a GI length control amount in such a manner as to shorten the GI length (S8). When $I_1$ is equal to $I_{1MAX}$, the GI length control amount is determined as 0 so as to maintain the current $I_1$ (S9). When $I_1$ is larger than $I_{1MAX}$, this means that communication cannot be established with the current state. Accordingly, in order to make $I_1$ smaller, the OFDM communication device 10 determines, in accordance with the difference between $I_1$ and $I_{1MAX}$, the GI length control amount in such a manner as to extend the GI length (S10).

The OFDM communication device 10 determines the GI length based on the GI length control amount thus determined and the current GI length (S11).

FIG. 5 is a diagram illustrating a relation between the GI length thus determined, and the background noise power $I_2$+N and the symbol delay interference wave power $I_1$. As illustrated in FIG. 5, as the background noise power $I_2$+N becomes larger, the GI length is more likely to be subjected to extending control even if the symbol delay interference wave power $I_1$ is small. Conversely, when the background noise power $I_2$+N is small, the GI length is more likely to be subjected to shortening control even if the symbol delay interference wave power $I_1$ becomes larger.

Lastly, the OFDM communication device 10 transmits the GI length instruction information to the communication partner, thereby notifying the communication partner of the GI length (S12). From then on, the communication partner who has received the GI length instruction information starts to transmit a unit symbol sequence having the GI length specified by the GI length instruction information.

As described above, with the OFDM communication device 10, the GI length can be determined in accordance with both the background noise power and the symbol delay interference wave power. With this configuration, the OFDM communication device 10 can control the GI length so that the minimum required SINR can be obtained even if the background noise is present.

The invention claimed is:

1. An OFDM communication device, comprising:
    a reception unit for receiving a series of symbols that contain a known signal portion;
    a correlation calculation unit for calculating a correlation between the series of symbols received by the reception unit and a held signal that has a waveform identical to a waveform of the known signal;
    a desired signal power acquisition unit for acquiring a desired signal power based on a calculation result from the correlation calculation unit;
    a background noise power acquisition unit for acquiring a background noise power that indicates a difference amount between a reception power of each of the series of symbols and the desired signal power acquired by the desired signal power acquisition unit;

a guard interval length determination unit for determining a guard interval length in accordance with the background noise power acquired by the background noise power acquisition unit; and a guard interval length instruction unit for instructing a transmitter to transmit the series of symbols with the guard interval length determined by the guard interval length determination unit.

2. An OFDM communication device according to claim 1, further comprising:

a symbol delay amount acquisition unit for acquiring a symbol delay amount based on the calculation result from the correlation calculation unit; and a symbol delay interference wave power acquisition unit for acquiring a symbol delay interference wave power, which is an interference wave power in a case where a certain symbol becomes an interference wave against a subsequent symbol, based on the desired signal power acquired by the desired signal power acquisition unit and the symbol delay amount acquired by the symbol delay amount acquisition unit, wherein the guard interval length determination unit determines the guard interval length in accordance with the background noise power acquired by the background noise power acquisition unit and the symbol delay interference wave power acquired by the symbol delay interference wave power acquisition unit.

3. An OFDM communication device according to claim 2, wherein:

the guard interval length determination unit comprises a necessary symbol delay interference wave power calculation unit for calculating, based on the background noise power acquired by the background noise power acquisition unit, a necessary symbol delay interference wave power required for setting an SINR to a predetermined value; and the guard interval length determination unit determines the guard interval length based on the necessary symbol delay interference wave power calculated by the necessary symbol delay interference wave power calculation unit and the symbol delay interference wave power acquired by the symbol delay interference wave power acquisition unit.

4. A method of determining a guard interval length, comprising:

a reception step of receiving a series of symbols that contain a known signal portion;

a correlation calculation step of calculating a correlation between the series of symbols received in the reception step and a held signal that has a waveform identical to a waveform of the known signal;

a symbol delay amount acquisition step of acquiring a symbol delay amount based on a calculation result of the correlation calculation;

a desired signal power acquisition step of acquiring a desired signal power based on the calculation result of the correlation calculation;

a symbol delay interference wave power acquisition step of acquiring a symbol delay interference wave power, which is an interference wave power in a case where a certain symbol becomes an interference wave against a subsequent symbol, based on the desired signal power acquired in the desired signal power acquisition step and the symbol delay amount acquired in the symbol delay amount acquisition step;

a background noise power acquisition step of acquiring a background noise power that indicates a difference amount between a reception power of each of the series of symbols and the desired signal power acquired in the desired signal power acquisition step;

a guard interval length determination step of determining a guard interval length in accordance with the background noise power acquired in the background noise power acquisition step and the symbol delay interference wave power acquired in the symbol delay interference wave power acquisition step; and a guard interval length instruction step of instructing a transmitter to transmit the series of symbols with the guard interval length determined in the guard interval length determination step.

* * * * *